United States Patent
Merdivan et al.

(10) Patent No.: US 10,586,156 B2
(45) Date of Patent: Mar. 10, 2020

(54) KNOWLEDGE CANVASSING USING A KNOWLEDGE GRAPH AND A QUESTION AND ANSWER SYSTEM

(71) Applicant: International Business Machines Corporation, Armonk, NY (US)

(72) Inventors: Erinc Merdivan, Dublin (IE); John A. Riendeau, Atlanta, GA (US); Jadran Sirotkovic, Dublin (IE); Michael D. Whitley, Durham, NC (US); Le Zhang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 14/749,733

(22) Filed: Jun. 25, 2015

(65) Prior Publication Data
US 2016/0378851 A1    Dec. 29, 2016

(51) Int. Cl.
| | | |
|---|---|---|
| G06N 5/02 | (2006.01) | |
| G06F 16/338 | (2019.01) | |
| G06F 16/332 | (2019.01) | |
| G06F 16/33 | (2019.01) | |
| G06F 16/901 | (2019.01) | |
| G06F 17/27 | (2006.01) | |
| G06F 40/247 | (2020.01) | |

(52) U.S. Cl.
CPC .......... G06N 5/022 (2013.01); G06F 16/338 (2019.01); G06F 16/3329 (2019.01); G06F 16/3344 (2019.01); G06F 16/9024 (2019.01); G06F 40/247 (2020.01)

(58) Field of Classification Search
None
See application file for complete search history.

(56) References Cited

U.S. PATENT DOCUMENTS

| | | |
|---|---|---|
| 5,390,281 A | 2/1995 | Luciw et al. |
| 5,794,050 A | 8/1998 | Dahlgren et al. |
| 6,715,145 B1 * | 3/2004 | Bowman-Amuah ..... G06F 8/20 718/100 |
| 8,145,636 B1 | 3/2012 | Jeh et al. |

(Continued)

OTHER PUBLICATIONS

"The Knowledge Graph", Google, http://www.google.com/insidesearch/features/search/knowledge.html, accessed on Apr. 6, 2015, 3 pages.

(Continued)

*Primary Examiner* — Mark E Hershley
*Assistant Examiner* — Mellissa M. Ohba
(74) *Attorney, Agent, or Firm* — Stephen R. Tkacs; Stephen J. Walder, Jr.; Diana R. Gerhard

(57) ABSTRACT

Mechanisms for processing a knowledge canvassing request receive a request specifying an entity of interest from an originator of the request and analyze the request to extract a feature of the request. The mechanisms determine whether the request is a targeted natural language question to be answered or a knowledge canvassing request, based on the extracted feature. In response to determining that the request is a knowledge canvassing request, the mechanisms process the request by identifying entities represented in a knowledge graph data structure as being related to the entity of interest. The mechanisms output results of the processing of the request to the originator of the request.

18 Claims, 6 Drawing Sheets

(56) References Cited

U.S. PATENT DOCUMENTS

| | | | |
|---|---|---|---|
| 8,346,701 B2* | 1/2013 | Wang | G06F 17/30634 |
| | | | 706/46 |
| 8,407,253 B2 | 3/2013 | Ryu et al. | |
| 8,438,189 B2 | 5/2013 | Andersen et al. | |
| 8,442,940 B1 | 5/2013 | Faletti et al. | |
| 8,538,744 B2* | 9/2013 | Roberts | G06F 17/30654 |
| | | | 379/265.01 |
| 8,744,837 B2 | 6/2014 | Heo et al. | |
| 8,812,495 B1 | 8/2014 | Pragada et al. | |
| 8,819,007 B2 | 8/2014 | Brown et al. | |
| 8,832,064 B2 | 9/2014 | Stenchikova et al. | |
| 8,843,488 B1 | 9/2014 | Chong et al. | |
| 8,983,962 B2* | 3/2015 | Nakazawa | G06F 17/30654 |
| | | | 707/738 |
| 9,116,982 B1 | 8/2015 | Stern et al. | |
| 9,411,857 B1 | 8/2016 | Chechik et al. | |
| 9,424,354 B2* | 8/2016 | Teevan | G06F 17/30722 |
| 9,582,482 B1 | 2/2017 | Sharifi et al. | |
| 2004/0024739 A1 | 2/2004 | Copperman et al. | |
| 2005/0060290 A1* | 3/2005 | Herscovici | G06F 16/951 |
| 2007/0106659 A1 | 5/2007 | Lu et al. | |
| 2008/0306908 A1 | 12/2008 | Agrawal et al. | |
| 2009/0012842 A1* | 1/2009 | Srinivasan | G06F 17/2785 |
| | | | 705/12 |
| 2009/0241058 A1 | 9/2009 | Costello et al. | |
| 2009/0287678 A1 | 11/2009 | Brown et al. | |
| 2010/0063948 A1 | 3/2010 | Virkar et al. | |
| 2010/0241647 A1* | 9/2010 | Ntoulas | G06F 17/30528 |
| | | | 707/765 |
| 2010/0250598 A1 | 9/2010 | Brauer et al. | |
| 2011/0066587 A1 | 3/2011 | Ferrucci et al. | |
| 2011/0106745 A1 | 5/2011 | Ylonen et al. | |
| 2011/0125734 A1 | 5/2011 | Duboue et al. | |
| 2011/0258196 A1 | 10/2011 | Lepsoy et al. | |
| 2012/0016678 A1* | 1/2012 | Gruber | G06F 17/3087 |
| | | | 704/275 |
| 2012/0078889 A1 | 3/2012 | Chu-Carroll et al. | |
| 2012/0078891 A1* | 3/2012 | Brown | G06F 17/30654 |
| | | | 707/723 |
| 2012/0079372 A1 | 3/2012 | Kandekar et al. | |
| 2012/0101807 A1 | 4/2012 | Heo et al. | |
| 2012/0158633 A1 | 6/2012 | Eder | |
| 2012/0233140 A1* | 9/2012 | Collins-Thompson | |
| | | | G06F 17/30672 |
| | | | 707/706 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0238594 A1 | 9/2013 | Hong et al. | |
| 2013/0332450 A1 | 12/2013 | Castelli et al. | |
| 2013/0346421 A1 | 12/2013 | Wang et al. | |
| 2014/0046934 A1 | 2/2014 | Zhou et al. | |
| 2014/0188927 A1 | 7/2014 | Moxley et al. | |
| 2014/0280114 A1 | 9/2014 | Keysar et al. | |
| 2014/0280307 A1* | 9/2014 | Gupta | G06F 17/30657 |
| | | | 707/769 |
| 2014/0351261 A1 | 11/2014 | Aswani et al. | |
| 2014/0358890 A1 | 12/2014 | Chen et al. | |
| 2015/0169758 A1 | 6/2015 | Assom et al. | |
| 2015/0294216 A1* | 10/2015 | Baughman | G06F 17/2765 |
| | | | 706/11 |
| 2015/0347569 A1* | 12/2015 | Allen | G06F 17/30654 |
| | | | 707/728 |
| 2015/0379414 A1 | 12/2015 | Yeh et al. | |
| 2016/0171119 A1* | 6/2016 | Bufe | H04L 67/36 |
| | | | 715/746 |
| 2017/0061324 A1* | 3/2017 | Glass | G06N 99/005 |

OTHER PUBLICATIONS

Cucerzan, Silviu et al., "Factoid Question Answering over Unstructured and Structured Web Content", Proceedings of the Fourteenth Text Retrieval Conference (TREC 2005), National Institute of Standards and Technology (NIST), Nov. 15-18, 2005, 6 pages.

Greenwood, Mark A. et al., "A Pattern Based Approach to Answering Factoid, List and Definition Questions", Conference: Computer-Assisted Information Retrieval (Recherche d'Information et ses Applications)—RIAO 2004, 7th International Conference, University of Avignon, France, Apr. 26-28, 2004, 12 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Wang, Mengqiu, "A Survey of Answer Extraction Techniques in Factoid Question Answering", Association for Computational Linguistics, 2006, 14 pages.

West, Robert et al., "Knowledge Base Completion via Search-Based Question Answering", Proceedings of the 23rd International World Wide Web Conference (WWW'14), Apr. 7-11, 2014, 11 pages.

Yuan, Michael J., "Watson and healthcare, How natural language processing and semantic search could revolutionize clinical decision support", IBM developerWorks, IBM Corporation, Apr. 12, 2011, 14 pages.

"List of IBM Patents or Patent Applications Treated as Related", Sep. 21, 2015, 2 pages.

Ounis, Iadh, "Inverse Document Frequency", In Liu L., Ozsu M.T.(eds) Encyclopedia of Database Systems. Springer, Boston, MA, https://doi.org/10.1007/978-0-387-39940-9. Accessed Jan. 29, 2019, 3 pages.

Silberschatz, Abraham et al., "Operating System Concepts, Eighth Edition", John Wiley & Sons, Jul. 29, 2008. ISBN-13: 978-0-470-12872-5, Accessed Sep. 2018, 3 pages.

* cited by examiner

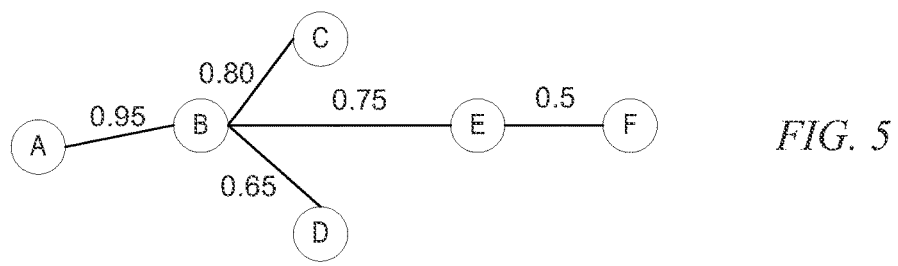

*FIG. 5*

REQUEST: ABRAHAM LINCOLN
                                                                           610

AMERICAN CIVIL WAR         RELATEDNESS: 98%   630

"Lincoln is ranked by historians as one of the greatest Presidents in American history, usually as number one, for winning the Civil War, bringing the nation back together as one, and abolishing slavery..."                    620

EMANCIPATION              RELATEDNESS: 90%

"The Emancipation Proclamation was a presidential proclamation and executive order issued by President Abraham Lincoln on January 1, 1863. In a single stroke it changed the legal status, as recognized by the United States federal government, of 3 million slaves..."

KNOWLEDGE CANVASSING USING A KNOWLEDGE GRAPH AND A QUESTION AND ANSWER SYSTEM

BACKGROUND

The present application relates generally to an improved data processing apparatus and method and more specifically to mechanisms for performing knowledge canvassing using a knowledge graph and a question and answer system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory, for processing a knowledge canvassing request is provided. The method comprises receiving, by the data processing system, a request specifying at least one entity of interest from an originator of the request and analyzing, by the data processing system, the request to extract one or more features of the request. The method further comprises determining, by the data processing system, whether the request is a targeted natural language question to be answered by the data processing system or a knowledge canvassing request, based on the one or more extracted features. Moreover, the method comprises, in response to determining that the request is a knowledge canvassing request, processing, by the data processing system, the request by identifying entities represented in a knowledge graph data structure as being related to the at least one entity of interest. In addition, the method comprises outputting, by the data processing system, results of the processing of the request to the originator of the request.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example diagram of a portion of a knowledge graph that may be used by the mechanisms of the illustrative embodiments;

FIG. 6 is an example diagram illustrating an output of a knowledge canvassing QA system in accordance with one illustrative embodiment.

DETAILED DESCRIPTION

Figure 1:
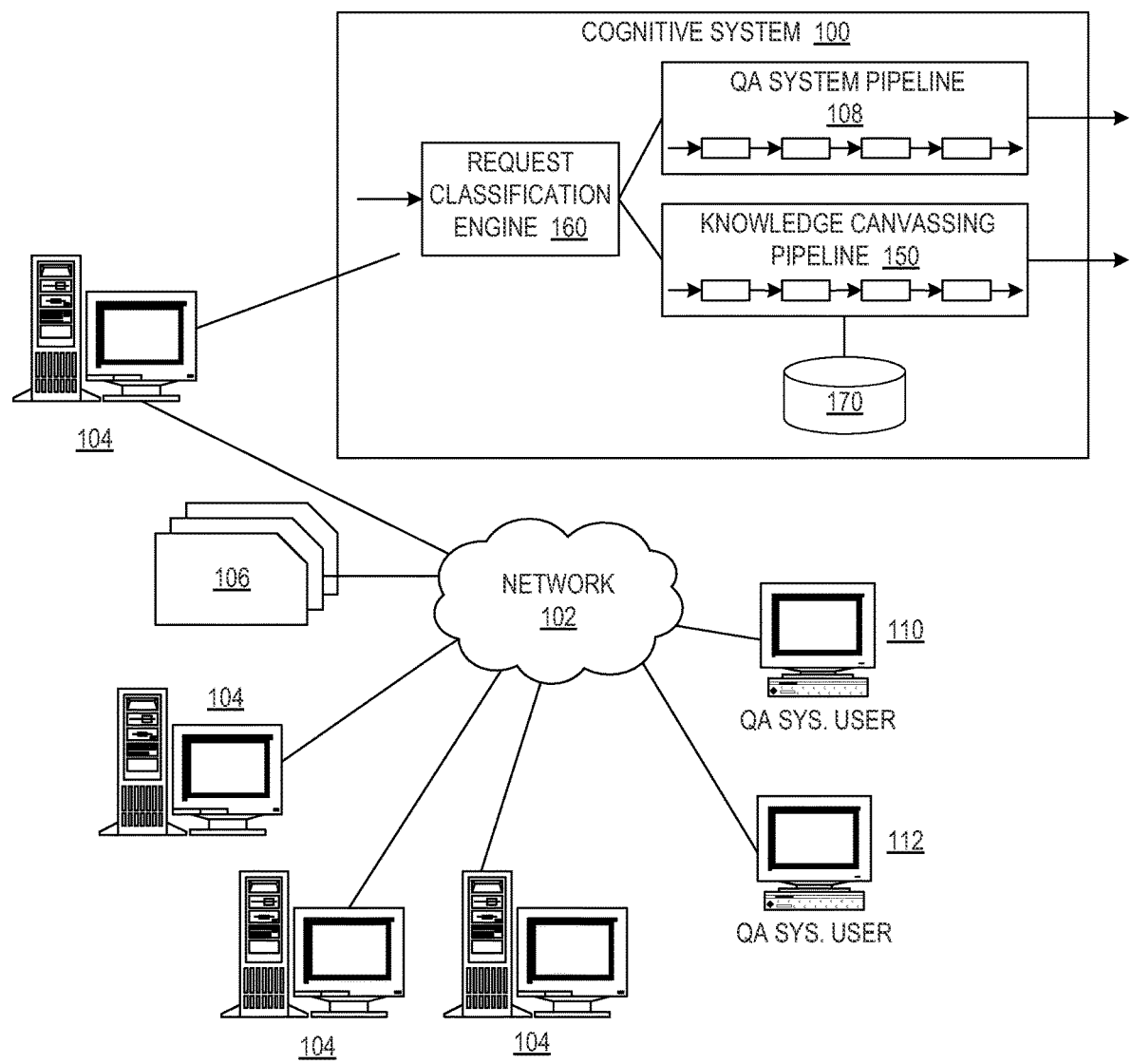
FIG. 1 depicts a schematic diagram of one illustrative embodiment of a question/answer creation (QA) system in a computer network.

The illustrative embodiments provide mechanisms for performing knowledge canvassing using a knowledge graph and a question and answer system. What is meant by knowledge canvassing is a process by which a non-targeted request is received with regard to a particular entity, and related entities are automatically identified so as to suggest other areas of potential interest to the submitter of the request. In this way, the user is not required to know explicitly what they want an answer to, but rather leverages knowledge about a particular entity to identify as many other entities related to the entity of interest in the request.

For example, Question and Answer (QA) systems, such as the IBM Watson™ QA system available from International Business Machines (IBM) Corporation of Armonk, N.Y., allow users to submit targeted questions in a natural language to the QA system which then processes the targeted question, such as by analyzing the question to identify the lexical answer type (LAT), the focus, the entities identified, and other features extracted from the question, and uses these features to generate queries that are applied to a corpus of information which then returns candidate answers, and/or a final answer, along with supporting evidence for the candidate answers, based on the results of the queries being applied to the corpus of information. However, for such QA systems to operate properly, the input question must be a targeted question asking for a particular type of answer, e.g., a lexical answer type (LAT), a focus, etc., e.g., a question of the type "Who was the first man to step on the moon?" Known QA systems are not able to process untargeted requests such as "the moon" or "astronauts" because there is no indication as to what the question is, the type of answer being sought, or the like.

The illustrative embodiments provide mechanisms for processing untargeted or non-targeted requests, i.e. requests that do not provide a natural language question but are interpreted to be a request for related entities to the one or more entities specified in the request, by providing a knowledge canvassing mechanism. The knowledge canvassing mechanism, based on an untargeted request specifying only an entity of interest, or a plurality of entities of interest, utilizes a knowledge graph to identify all of the entities in the knowledge graph that are related to the entity, or entities, specified in the untargeted request. In this way, the mechanisms of the illustrative embodiments canvass the knowledge associated with the entity, or entities, of interest. The knowledge canvassing mechanism returns the identified related entities as potential related entities of interest to the originator of the original request. Hereafter, for ease of explanation, it will be assumed unless otherwise stated that only a single entity is specified in the knowledge canvassing request although it should be appreciated that multiple entities of interest may be specified, as this will be described later herein In particular, the mechanisms of the illustrative embodiment provide a plurality of QA system pipelines for generating answers to requests submitted to the QA system. A first QA system pipeline, referred to as a factoid QA system pipeline, is the generally known QA system pipeline that processes targeted input questions specifying, where the term "factoid" refers to a briefly stated fact. There may be multiple first QA system pipelines depending on the particular implementation, such as separate factoid QA system pipelines for different domains, or the like. A second QA system pipeline, referred to herein as a "knowledge canvassing" pipeline, implements mechanisms in accordance with the illustrative embodiments to perform knowledge canvassing. Mechanisms are provided for analyzing the input request and determining whether the request includes a targeted question, for processing using known QA system pipeline processing, or a general untargeted request regarding an entity of interest, i.e. a knowledge canvassing request, to be processed by a knowledge canvassing pipeline in accordance with the improvements provided by the illustrative embodiments. It should be appreciated that the term "entity" in the context of this description refers to any person, place, thing, concept, or event.

With the mechanisms of the illustrative embodiments, if a request is classified as a knowledge canvassing request, a knowledge graph is analyzed to identify the entity of interest and links from or to the entity of interest from/to other related entities in the knowledge graph. These related entities may be directly linked to the entity of interest or indirectly linked. The knowledge graph comprises one or more graph data structures representing entities as nodes in the graph and edges between the nodes represent relationships between the entities. The edges may have associated weights indicating the strengths of the relationships between the entities. The knowledge graph may be generated in any manner generally known in the art or later developed. In general, mechanisms for generating a knowledge graph may comprise analysis mechanisms that analyze a corpus of information to identify entities and information in the corpus that specifies relationships between the entities. Based on the nature of the relationship, the amount of evidence present in the corpus to support the relationship, evaluations of the particular sources of the information indicating such relationships or evidence supporting such relationships, and other factors, a strength value or weight value is associated with the corresponding edges between nodes (entities). In some cases, the strength/weight value may be simply the number of times that a relationship between entity A (entity of interest) and entity B (related entity that is connected to entity A by one or more links in the knowledge graph) is found to exist in the evidence or other content, such as a corpus of information. In other cases, more complex functions of strength/weight may be utilized that take into account various factors for determining the strength of a relationship including, as noted above, the nature of the relationship, the number of times the relationship is referenced in evidence or a corpus of information, the direct/indirect nature of the relationship, and the like.

Having processed the knowledge graph to identify related entities to an entity of interest, the related entities may then be ranked according to one or more criteria so as to provide a ranked listing of the related entities that may be returned to the originator of the request. The ranking may be based on an associated metric, such as the strength of the edges between the nodes along a path from the node corresponding to the entity of interest and related nodes, keeping in mind that the path may be comprised of a plurality of nodes and edges such that a path can be traced from the entity of interest to the related entity. The metric may further be a function of the strengths/weights of the links. For example, in one illustrative embodiment an inverse document frequency (IDF) value, that is a function of the number of times that a relationship occurs in evidence or a corpus of information, is utilized as a metric for evaluation against the one or more criteria for ranking. Moreover, combinations of IDF values for multiple edges/links in connecting the entity of interest to the related entity may be utilized, e.g., an average of the IDF values of the links from node A to related node B in the knowledge graph, a maximum/minimum IDF value, a mean IDF value, or the like may be utilized as the metric.

The ranked listing preferably presents the related entities in a manner so as to suggest to the originator of the request the entities believed to be potentially of most interest to the originator. The criteria by which to rank the related entities may be domain specific. That is, criteria that indicates related entities relationships that are good or of most interest may differ between domains. Thus, for example, in a Life Science domain, relationships between entities that are determined to be "good" relationships may be the relationships that are most common to the entity of interest. In a Criminal domain, relationships that are determined to be the most rare in the knowledge graph may be determined to be "good" relationships. Hence, the mechanisms of the illustrative embodiments are flexible to accommodate processing of a knowledge graph with regard to various domains.

The criteria may be applied to the strengths of the relationships so as to select those that should be more highly ranked than others. For example, if for the domain a "good" relationship is one that is less common, then a smaller strength (more rare relationship) may be determined to be better than a strength that is relatively large value (more common relationship). The strengths of relationships may be modified by various factors including, for example, a factor based on whether or not the relationship is a direct or indirect relationship. For example, indirect relationships may be adjusted to have a lower strength than direct relationships. The level of indirectness may increase the adjustment to lower the strength of the relationship, e.g., more links between the entity of interest and the final entity in the chain of relationships will increase the reduction in the strength of the relationship. This will represent indirect relationships as relatively weaker and less common than other more direct relationships.

The ranked listing of related entities may then be returned along with any corresponding passages of text or other content linked to the related entities. That is, in a cognitive system utilizing a knowledge graph, the nodes and edges of the graph are linked to individual passages or portions of content where the entity of the node occurs or is otherwise referenced, referred to herein as evidence passages. Thus, when presenting the ranked listing of related entities, the mechanisms of the illustrative embodiments may provide a summary of these evidence passages, a portion of a most highly ranked one of these evidence passages, or the like. For example, if the user originally entered "Abraham Lincoln," and a highly ranked result is returned associated with a node corresponding to the entity "American Civil War" and the edge linking Abraham Lincoln and the American Civil War, then a corresponding portion of a linked passage of the type "Lincoln is ranked by historians as one of the greatest Presidents in American history, usually as number one, for winning the Civil War, bringing the nation back together as one, and abolishing slavery . . . " may be presented in the ranked listing.

In this way, the user has effectively canvassed a knowledge source for related entities to an entity of interest without having to present targeted questions regarding the entity of interest. As a result, the user is presented with information that is believed to have a highest probability of being of interest to the user. The results may be returned in a graphical user interface where the results are selectable to access the evidence passages associated with the related entities and/or initiate a new round of canvassing based on the newly selected related entity as the new entity of interest. This process may be repeated as many times as desired by the user to access evidence passages and perform additional canvassing of entities.

Thus, the mechanisms of the illustrative embodiments provide facilities to perform both targeted question answering and knowledge canvassing requests. In one illustrative embodiment, these operations are performed in the alternative based on a classification of the input request. In other illustrative embodiments, both operations may be performed concurrently. Thus, a user may submit a targeted question and receive an answer to the targeted question using the first QA system pipeline and, at approximately the same time, receive information regarding the ranked listing of related entities as obtained from processing of the targeted question using a knowledge canvassing pipeline. In this way, the user is effectively told the answer to their question and given other related information that the user may be interested in as well, even though the user did not specifically request this related information.

Before beginning the discussion of the various aspects of the illustrative embodiments in more detail, it should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
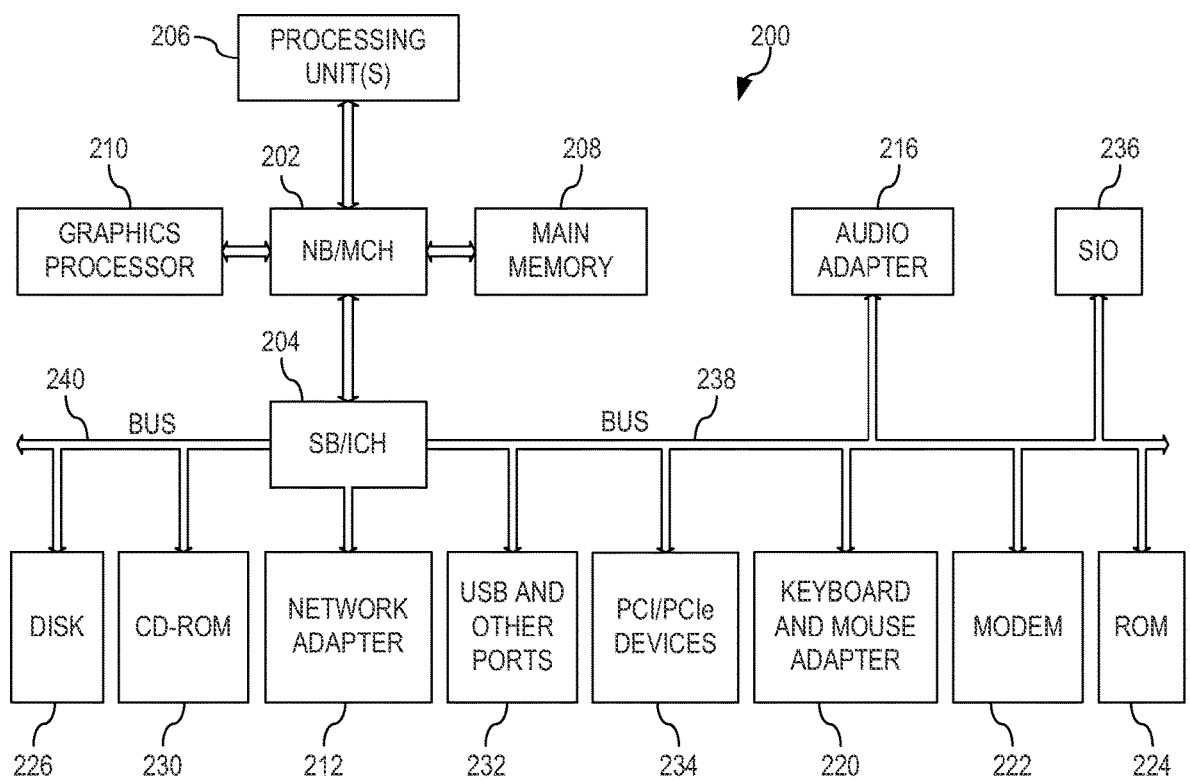
FIG. 2 is a block diagram of an example data processing system in which aspects of the illustrative embodiments are implemented.
Figure 3:
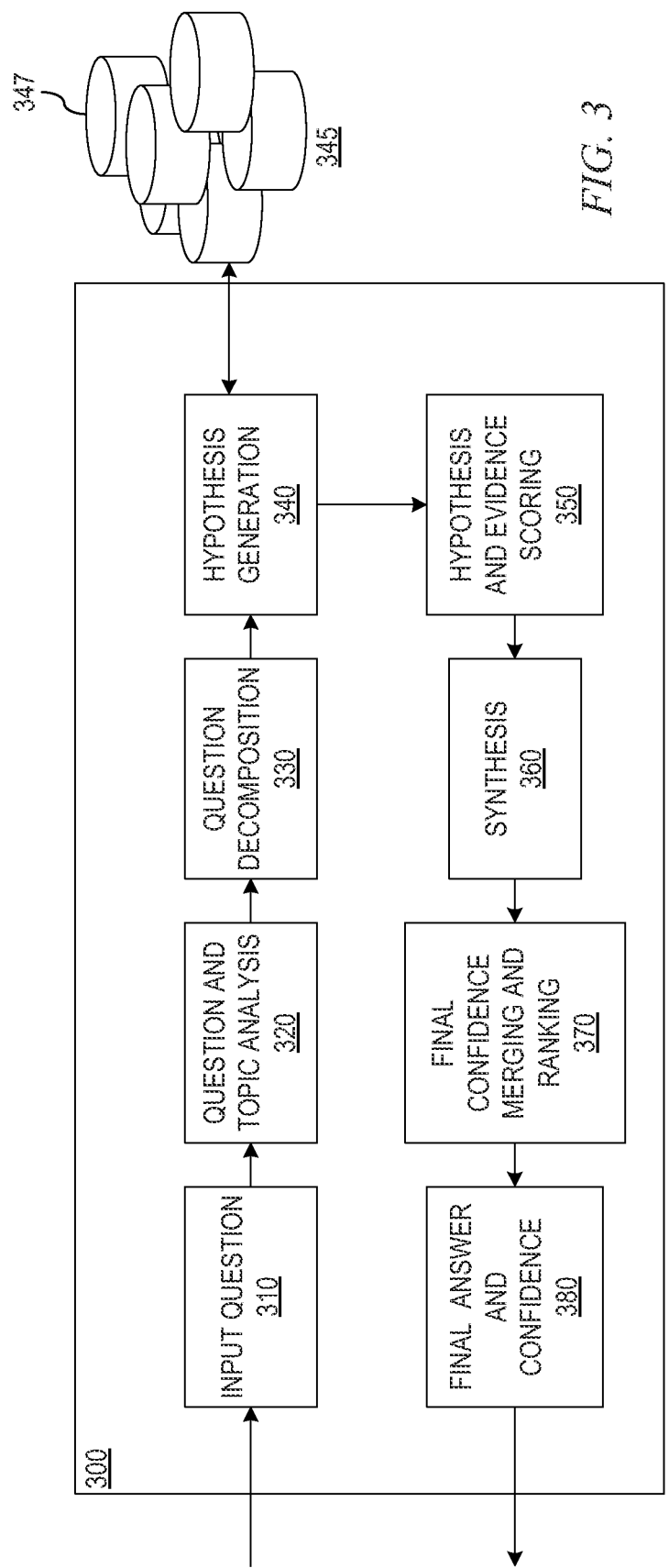
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA pipeline mechanisms of the cognitive system with regard to providing a knowledge canvassing capability. That is, the QA pipeline mechanisms provide the ability to perform targeted question answering and also knowledge canvassing based on a request identifying an entity of interest. The mechanisms of the illustrative embodiments further provide functionality for analyzing a request and categorizing the request as either a targeted question or a knowledge canvassing request and directing the processing to one or more QA pipelines in accordance with this classification of the request. In some embodiments, both targeted question processing and knowledge canvassing may be performed and results of both types of pipelines may be returned to the originator of a request.

Since the illustrative embodiments augment the operation of a cognitive system that includes a QA system pipeline for answering targeted natural language questions input to the QA system pipeline, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a knowledge canvassing pipeline 150 and a request classification engine 160. The request classification engine 160 analyzes the input request submitted to the cognitive system 100 to determine whether the request is a targeted question for which a specific type of answer is requested, or a general non-targeted request for knowledge canvassing that specifies an entity of interest. Based on the classification of the request as one or the other of these types of requests, the request classification engine 160 directs the processing of the request to one of the QA system pipeline 108 or the knowledge canvassing pipeline 150.

The request classification engine 160 may perform analysis on the input request from a user to extract features of the request, which are then compared against one or more classification rules and/or patterns, to identify whether the input request specifies a targeted question or a non-targeted canvassing request. For example, if the request specifies a targeted natural language question, then the features extracted from the natural language question comprises a lexical answer type (LAT), focus, various keywords, key phrases, and patterns of nouns, verbs, and the like, e.g., "When did Abraham Lincoln give the Gettysburg Address?". If the request specifies an entity of interest for purposes of canvassing a knowledge base, then the features extracted from the request may not include many of the features representative of a targeted natural language question and may include only one or more entities, e.g., "Abraham Lincoln and Gettysburg" which does not include a LAT or focus.

If the request classification engine 160 determines that the request comprises a targeted natural language question, then the processing of the request is directed to the QA system pipeline 108. If the request classification engine 160 determines that the request comprises a non-targeted canvassing request, then the request processing is directed to the knowledge canvassing pipeline 150. In some illustrative embodiments, even in the case where the request is determined to be a targeted natural language question, the request may be processed by both pipelines 108, 150 with the processing by the knowledge canvassing pipeline 150 being performed on the identified entities in the input request.

As noted above, the knowledge canvassing pipeline 150 analyzes the entity specified in the request and performs a search of one or more knowledge graphs 170 to identify a node in the knowledge graphs 170 corresponding to the entity of interest. Based on the identification of the node corresponding to the entity of interest in the one or more knowledge graphs 170, links to other nodes in the knowledge graphs 170 from the identified node are identified to thereby identify other entities directly or indirectly related to the entity of interest. Based on the relationships identified, as indicated by the links between nodes in the knowledge graph, the strengths of these relationships, and the ranking criteria specific to the particular domain of interest, a ranked listing of the entities related to the entity of interest is generated along with supporting information content, e.g., evidence passages, associated with the related entities as obtained from a corpus of information. The ranked listing of related entities may then be returned to the originator (e.g., user) that submitted the original request as a knowledge canvassing response. The related entities in the knowledge canvassing response may be presented such that they are user selectable so as to obtain additional information associated with the related entities and/or initiate a new knowledge canvassing request.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

The description of FIG. 3 above illustrates the operation of a QA system pipeline with regard to a targeted question, i.e. a question that identifies the particular type of answer that is being requested and the basis by which to determine the answer to the question, e.g., "Who was the first person to step on the moon?" indicates that the answer being sought is a person's name, and the answer will refer to stepping on the moon, and more particularly the "first" person to step on the moon. This is opposed to a request that merely mentions "the moon" in which case all that is specified is an entity of interest without any indication as to what question is being asked. This latter case is a knowledge canvassing request in that it indicates an entity of interest and the submission of the request implies a request for any and all knowledge about the entity of interest. It should be appreciated that knowledge canvassing requests may specify more than one entity of interest in which case analysis of each entity of interest is necessary in accordance with the illustrative embodiments as discussed hereafter.

Figure 4:
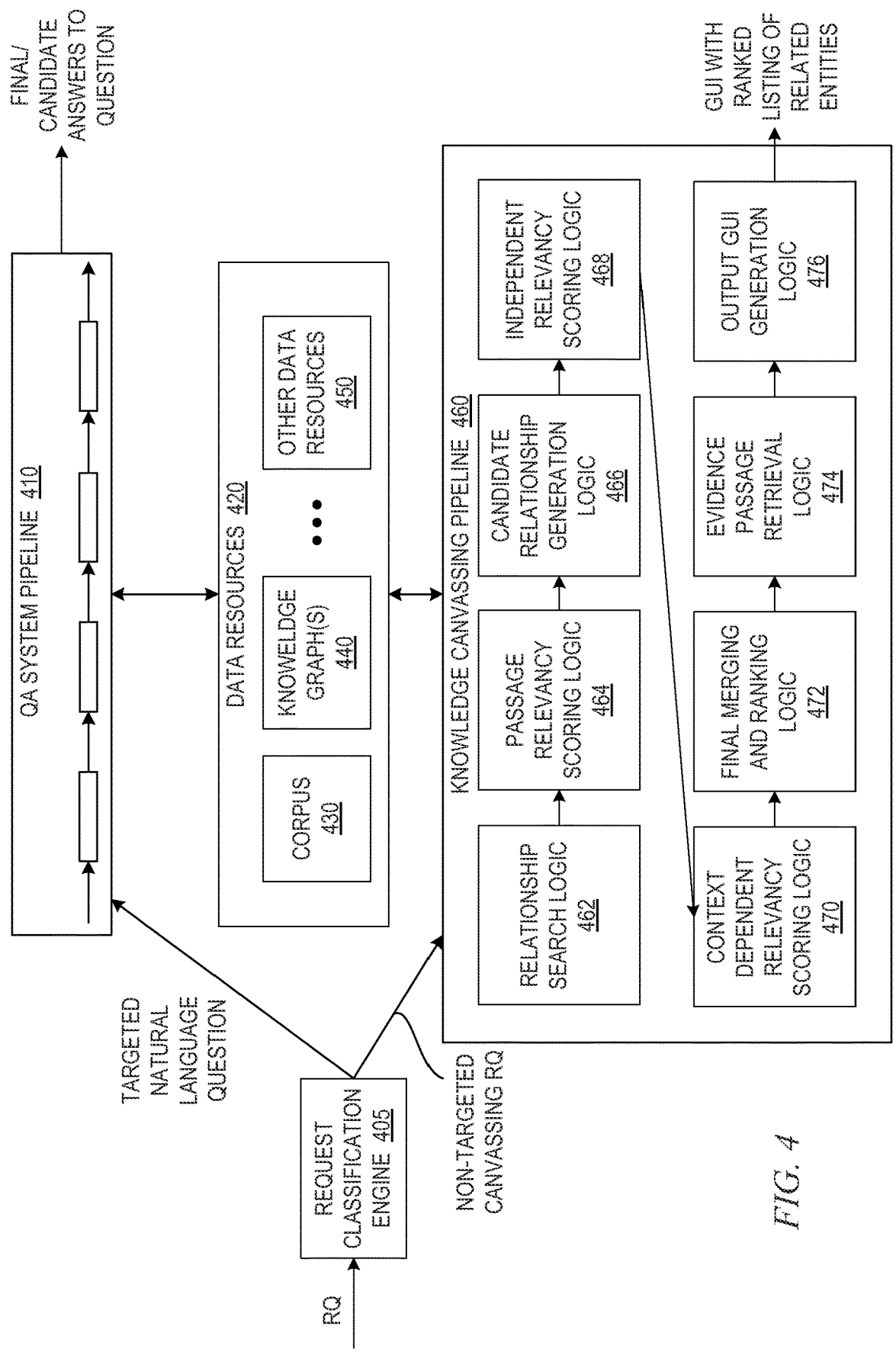
FIG. 4 is an example diagram illustrating a knowledge canvassing QA system having a multi-pipeline architecture in accordance with one illustrative embodiment.

FIG. 4 is an example diagram illustrating a knowledge canvassing QA system having a multi-pipeline architecture in accordance with one illustrative embodiment. As shown in FIG. 4, the knowledge canvassing QA system 400 comprises a first targeted question analysis pipeline 410 and a second knowledge canvassing pipeline 460. The knowledge canvassing QA system 400 further comprises a request classification engine 405. The request classification engine 405 performs operations to analyze the input request, extract features from the input request, and apply rules/patterns to classify the input request into either a targeted natural language question or a non-targeted knowledge canvassing request. In one illustrative embodiment, the request classification engine 405 may utilize analysis similar to that described above with regard to stage 320 in FIG. 3, and in some illustrative embodiments the stage 320 may be integrated into the request classification engine 405. The request classification engine 405 augments the operation of the logic of stage 320 by providing classification logic that applies rules/patterns indicative of a targeted natural language question (or "factoid" rules/patterns) and/or non-targeted knowledge canvassing request (or "canvassing" rules/patterns). The rules/patterns may utilize templates in some illustrative embodiments to define the structure and requirements of a request for matching the rules/patterns. If the criteria of a rule/pattern are met by the application of the rules/patterns to the extracted features obtained from analysis of the input request, then the request classification engine 405 classifies the request as a corresponding one of a targeted natural language question or non-targeted knowledge canvassing request. In some illustrative embodiments, the rules/patterns applied by the request classification engine 405 may be of only a canvassing rule/pattern type such that if there is a matching rule/pattern, the request is classified as a knowledge canvassing request and if the criteria of the rule/pattern are not met, then the request is classified by the request classification engine 405 as a targeted natural language question.

Based on the classification performed by the request classification engine 405, the request is passed to at least one of the pipelines 410 and 460. If the request is classified as a targeted natural language question, the request is sent to the QA system pipeline 410 which processes the request as a natural language question in the manner described above with regard to FIG. 3. If the request is classified as a non-targeted knowledge canvassing request, then the request is processed by the knowledge canvassing pipeline 460 in accordance with the operation described hereafter. In some embodiments, even in the case that the request is determined to be a targeted natural language question, the request may be processed by both pipelines 410 and 460 in a parallel manner.

As shown in FIG. 4, the pipelines 410 and 460 may operate based on a plurality of data resources 420 which may include an information corpus or corpora 430 (which may be the corpus/corpora 345/347 in FIG. 3), one or more knowledge graphs (KGs) 440, and other data resources 450, e.g., domain specific or domain independent dictionaries, synonym data structures, semantic and syntactic rules data structures, or any other data resource determined to be of beneficial use for natural language processing, question answering, and/or knowledge canvassing. The pipelines 410 and 460 may utilize these data resources 420 to perform their various question answering and knowledge canvassing operations. For example, the QA system pipeline 410 may utilize the other data resources 450 to process the input question in the input request to break down the input question into queries as discussed above as well as annotate and/or search the corpus 430 based on such queries. Moreover, the QA system pipeline 410 may utilize the corpus 430 and other data resources 450 to identify candidate answers as well as identify evidence passages for use in scoring candidate answers in the manner previously described. The knowledge graphs 440 may also be utilized by the QA system pipeline 410 to achieve this functionality as well, in a manner generally known in the art.

The knowledge graphs 440 may be generated in any known or later developed manner and generally include a set of nodes representing entities and a set of edges or links connecting these nodes so as to represent relationships between the nodes, where such relationships exist. The nodes and edges may have associated attributes for defining various aspects of the particular nodes/edges depending on the type of the nodes/edges. Thus, for example, nodes may have many different attributes based on the type of entity represented by the node, e.g., a person entity may have attributes of name, address, age, gender, ethnicity, place of employment, etc. while a node representing a place entity may have a name of the place, a geographic location, and other attributes for defining the place. Attributes for an edge or link may include a type of relationship represented by the edge/link, e.g., family relationship, co-worker relationship, etc., as well as a strength or weight associated with the edge/link which may be calculated in many different ways as previously discussed above.

As shown in FIG. 4, the knowledge canvassing pipeline 460 comprises various stages of processing of a knowledge canvassing request routed to the pipeline 460 by the request classification engine 405. These stages of processing implement logic configured to perform the corresponding operations of the particular stage with this logic being implemented in specialized hardware devices, software instructions executed on hardware devices of one or more data processing systems, or any combination of executed software instructions and specialized hardware devices.

Initially, when the knowledge canvassing pipeline 460 receives the request routed to it by the request classification engine 405, the request has the entities specified in the request already identified by virtue of the operation of the request classification engine 405. Relationship search logic 462 utilizes the identified entities to perform a search of the knowledge graph 440 to find corresponding nodes to the identified entities. This search may comprise performing a text word search, key phrase search, or other search based on the identified entity for a matching corresponding text, key phrase, or other extracted attribute of the identified entities in association with one or more nodes of the knowledge graph 440. This provides the nodes in the knowledge graph that correspond to the entities of interest specified in the request. For ease of explanation, it will be assumed that only one entity of interest is specified in the request in the present description, however it should be appreciated that multiple entities of interest may be specified in the request and the mechanisms of the illustrative embodiments may be extended to processing each of the entities of interest and combinations of the entities of interest.

Having identified the node corresponding to the entity of interest (or multiple nodes for multiple entities of interest), referred to herein as the starting node, the relationship search logic 462 identifies other nodes in the knowledge graph 440 that have links connecting the starting node with these other nodes. These related entities may be directly linked to the starting node or indirectly linked. For example, a direct link or relationship comprises a single link or edge between the starting node and the other node. An indirect link or relationship comprises a plurality of links or edges and one or more intervening nodes between the starting node and the other node, e.g., node A linked to node B, which is linked to node C such that node C is indirectly related to node A. The result is a listing of the relationships between the starting node and each other node connected to the starting node either directly or indirectly in the knowledge graph.

Having processed the knowledge graph to identify related entities to an entity of interest, passage relevancy scoring logic 464 operates on the related nodes to analyze the evidence passages of the corpus 430 which are associated with the various related nodes to determine if there is support for the corresponding relationships with the starting node. The analysis performed by the passage relevance scoring logic 464 may be similar to that performed by the QA system pipeline 410 when performing scoring of candidate answers and evaluation using evidence passages in the corpus 430 to find support for the candidate answer. This passage relevancy scoring logic 464 is used to assist in filtering relationships found in the knowledge graph 430 but which represent noise in the knowledge graph. That is, sometimes when the knowledge graph 430 is generated, edges between nodes are generated due to noise introduced by the algorithms run to extract relationships and the inherent error in the nature of the analysis performed. The passage relevancy scoring logic 464 outputs a filtered listing of relationships between the starting node and related nodes. It should be appreciated that this filtered listing of relationships may comprise all of the information necessary to represent the relationship between the starting node and the corresponding related node including identification of any intervening nodes, a listing of the edges/links between the starting node and the related node, attributes of the nodes and the edges/links, or the like.

Candidate relationship generation logic 466 receives the filtered listing of relationships and utilizes candidate relationship selection criteria to select a subset of the candidate relationships from the listing as potential relationships to return to the originator of the input request. Various types of selection criteria may be utilized to select the candidate relationships for further processing. In one illustrative embodiment, the candidate relationship selection criteria comprises simply selecting candidate relationships that do not include entities identified in the original input request. That is, if the original input request identified entity A and entity B, and the filtered listing of candidate relationships included a relationship from entity A to entity B, that candidate relationship would be eliminated since it involves a related node that represents an entity that was already identified in the original input request. Other types of selection criteria may be implemented without departing from the spirit and scope of the illustrative embodiments.

For example, the original input request may simply identify entity A and entity B, such as a tuple of (A, B) which may be interpreted by the illustrative embodiment as a request to "Tell me about entities that are related to both A and B." In such an example illustrative embodiment, using a specific example, if the user submitted an input request of "Barack Obama, Michelle Obama," meaning "tell me about entities that are related to both Barack Obama and Michelle Obama," a response of "Barack Obama is married to Michelle Obama" is really not an answer to the request the user implicitly made and thus, would be one that is filtered out by the selection criteria. It is worth noting that the semantics that are attached to input requests such as "A, B" are implementation specific and may vary depending upon the desired implementation. For example, another implementation of the canvassing pipeline of the illustrative embodiments may interpret an input request of the type "A, B" as "tell me about the relationships between A and B" instead, and thus, the selection criteria may be different for that particular implementation.

Having identified a set of candidate relationships for processing, the candidate relationships are evaluated using independent relevancy scoring logic 468 and context dependent relevancy scoring logic 470. The independent relevancy scoring logic 468 performs analysis of the candidate relationships that is context independent. Such analysis may involve determining the number of times that the entities corresponding to the start and end nodes (the final related node in the relationship with which a relationship is asserted between the start node and the end node, e.g., node A is related to node B) of a candidate relationship appear in the same portion of content across the corpus 430, how many times each entity corresponding to the start node and end node of a candidate relationship appears individually within content across the corpus 430, how many times all of the entities of all of the nodes of a candidate relationship appear within a same portion of content across the corpus 430, or any other quantitative evaluation of the nodes and/or relationships that is context independent. In one illustrative embodiment, an inverse document frequency (IDF) calculation is performed with regard to the entities of the candidate relationship to determine how normal it is within the corpus to refer to both the entity corresponding to the starting node and the entity corresponding to the end node (related node) together in the same portion of content. The IDF may be a function of the number of times the start node entity and/or end node entity is present within the corpus individually in relation to a number of times a combination of the start entity and end node entity are present together within the corpus 430, for example. This IDF value may be associated with the candidate relationship as a context independent metric. Of course other context independent metrics that are indicative of how frequent or regular the candidate relationship appears within the corpus 430 may be used without departing from the spirit and scope of the illustrative embodiments.

In some illustrative embodiments, the context independent metric is a function of the strength or weight values associated with the edges between the nodes along a path from the start node to the end node, keeping in mind that the path may be comprised a plurality of nodes and edges such that a path can be traced from the entity of interest to the related entity. That is, as mentioned above, when generating a knowledge graph 440, mechanisms for generating such knowledge graphs often perform analysis of data resources to determine a strength of the links between entities represented by the nodes of the knowledge graph. In such a case, the mechanisms of the illustrative embodiments may leverage such strength, or weight, values to generate context independent metrics. These context independent metrics may be a function of the strengths/weights of the links. For example, in one illustrative embodiment an inverse document frequency (IDF) value, that is a function of the strength or weight associated with an edge, is utilized as a metric. Moreover, combinations of IDF values for multiple edges/links in connecting the entity of interest (start node) to the related entity (end node) may be utilized, e.g., an average of the IDF values of the links from node A to related node B in the knowledge graph, a maximum/minimum IDF value, a mean IDF value, or the like may be utilized as the metric.

The context dependent relevancy scoring logic 470 identifies portions of the corpus 430 where the entities of the candidate relationship are mentioned and evaluates the context of these mentions in the corpus 430 to determine a context dependent metric to associate with the candidate relationship. For example, the context dependent relevancy scoring logic 470 may analyze a portion of content that includes a reference to both entity A and entity B of a candidate relationship and determine how close the references to the entities are in the portion of content, e.g., how many characters, sentences, paragraphs, etc. there are between the references. References to entities of the candidate relationship that are close to one another, e.g., within the same sentence, within a small window of characters, or the like, are likely to have stronger support for the candidate relationship than references that are relatively sparse, e.g., multiple paragraphs away from each other.

The logic 470 may further analyze whether a relationship of the type corresponding to the candidate relationship is mentioned in the portion of content, e.g., if the candidate relationship is that entity A has a family relationship with entity B, then the context dependent relevancy scoring logic 470 may evaluate the portion of content where entities A and B are mentioned to determine if the "family" relationship is also mentioned, which may involve a more complex evaluation with regard to various terms, phrases, and the like that are recognized as "family" type relationships, e.g., cousin, sibling, parental, or other types of family relationships. In another example operation of the context dependent relevancy scoring logic 470, the logic 470 may analyze not only the proximity of the input and the candidate related entities in text, but may also check the textual passages where these entities are in a same window of text, e.g., sentence, paragraph, etc., but the window of text is a particular type of text, e.g., a question. For example, for an input request directed to "Abraham Lincoln" and a candidate related entity of "Civil War," a higher score may be given for a passage where these entities are not presented together in the form of a question, e.g., the passage "Abraham Lincoln was President during the Civil War" would be scored more highly than another passage of the type "Was Abraham Lincoln President during the Civil War?" Of course the logic 470 may implement a plethora of other types of scoring logic that scores content based on various criteria that are implementation dependent.

The result of the analysis performed by the logic 468 and 470 is a filtered listing of candidate relationships with associated context dependent and context independent metrics. This information is input to the final merging and ranking logic 472 which determines a ranked listing of the candidate relationships based on the context dependent and context independent metrics. Any suitable function that evaluates the context dependent and context independent metrics against predetermined ranking criteria may be used without departing from the spirit and scope of the illustrative embodiments. For example, context dependent metrics may be weighted more heavily than context independent metrics or vice versa. The criteria may be domain specific such that what is determined to be "good" for one domain may not be determined to be "good" for another domain, e.g., candidate relationships having a high frequency of occurrence, as determined from relatively higher context dependent and context independent metrics, may be good within a first domain (e.g., a Life Sciences domain), while in another domain (e.g., Criminal Investigations), candidate relationships with a low frequency of occurrence in a context independent sense and yet high frequency of occurrence in a context dependent sense are more beneficial. Any evaluation of the context dependent and context independent metrics against pre-determined criteria is intended to be within the spirit and scope of the illustrative embodiments.

Using IDF and strengths of edges/links between entities of the candidate relationship, the ranking criteria may be applied to the strengths of the relationships so as to select those that should be more highly ranked than others. For example, if for the domain a "good" relationship is one that is less common, then a smaller strength (more rare relationship) may be determined to be better than a strength that is relatively large value (more common relationship). The strengths of relationships may be modified by various factors including, for example, a factor based on whether or not the relationship is a direct or indirect relationship. For example, indirect relationships may be adjusted to have a lower strength than direct relationships. The level of indirectness may increase the adjustment to lower the strength of the relationship, e.g., more links between the entity of interest and the final entity in the chain of relationships will increase the reduction in the strength of the relationship. This will represent indirect relationships as relatively weaker and less common than other more direct relationships.

The ranked listing of related entities may then be provided by the final merging and ranking logic 472 to the evidence passage retrieval logic 474 which retrieves evidential passages from the corpus 430 that reference the entities in the candidate relationships. The evidential passages are evaluated to determine those that support the candidate relationship and scoring of the candidate relationship is updated based on the supporting evidential passages, similar to known QA system pipelines, such as is done in the IBM Watson™ QA system pipeline. The resulting ranked listing of candidate relationships along with any corresponding evidence passages of text or other content linked to the related entities may then be returned to the originator of the input request via the output graphical user interface (GUI) generation logic 476. When presenting the ranked listing of candidate relationships, e.g., a ranked listing identifying related entities, the mechanisms of the illustrative embodiments may provide a summary of these evidence passages, a portion of a most highly ranked one of these evidence passages, or the like, in the GUI that is output. Thus, as mentioned above, if the user originally entered "Abraham Lincoln," and a highly ranked result is returned associated with a node corresponding to the entity "American Civil War" and the edge connecting Abraham Lincoln and the American Civil War, then a corresponding portion of a linked passage of the type "Lincoln is ranked by historians as one of the greatest Presidents in American history, usually as number one, for winning the Civil War, bringing the nation back together as one, and abolishing slavery . . . " may be presented in the ranked listing.

Thus, with the processing of the knowledge canvassing request by the knowledge canvassing pipeline 460, the user has effectively canvassed a knowledge source, e.g., the knowledge graph 440 and corpus 430, for related entities to an entity of interest without having to present targeted questions regarding the entity of interest. As a result, the user is presented with information that is believed to have a highest probability of being of interest to the user. The results may be returned in a graphical user interface where the results are selectable to access the evidence passages associated with the related entities and/or initiate a new round of canvassing based on the newly selected related entity as the new entity of interest. This process may be repeated as many times as desired by the user to access evidence passages and perform additional canvassing of entities.

As noted above, the knowledge canvassing operation performed by the knowledge canvassing pipeline 460 operates based on an analysis of one or more knowledge graphs which comprise nodes and edges linking nodes so as to illustrate relationships between nodes. FIG. 5 is an example diagram of a portion of a knowledge graph that may be used by the mechanisms of the illustrative embodiments. It should be appreciated that FIG. 5 is a simplified form of a portion of a knowledge graph and that the actual knowledge graph data structures 440 may be more complex and may have a large number of nodes and edges well beyond that shown in FIG. 5.

As shown in FIG. 5, a plurality of nodes A, B, C, D, E, and F are provided which each represent different entities of the same or different types. For example, node A may represent a person type entity while node B represents a place or location type entity. Each node may have a set of attributes corresponding to the particular type of entity represented by that node as discussed above. The edges between the nodes may represent different types of relationships between the nodes that the connect and may have different attributes depending on the type of relationship.

In some illustrative embodiments, the edges may have associated strength or weight values indicative of strength of the relationship between the nodes that the edge connects. This strength or weight may be based on a frequency of occurrence of the relationship in a corpus of information, such as corpus 430. Thus, if the relationship between nodes A and B occurs often in the corpus 430, then its strength is expected to be higher than a relationship between node B and node C if the relationship between node B and node C occurs relatively less frequently.

As shown in FIG. 5, relationships between nodes may be direct or indirect. For example, in FIG. 5, the relationship between node A and node B is a direct relationship comprising a single edge or link. The relationship between node A and node F is an indirect relationship comprising a plurality of edges or links and one or more intervening nodes, e.g., nodes B and E in this example. For indirect nodes, the strength of a relationship between the start node, e.g., node A, and the end node, e.g., node F, may be a function of the strengths of the individual edges/links along the path from the start node to the end node. Similarly, any context independent metric representing the relationship may also be a function of these individual strengths, e.g., the IDF of the relationship may be a function of the individual IDFs of each edge/link along the path.

A knowledge graph, such as shown in FIG. 5, may be used as a basis for identifying relationships with other entities in the manner previously described above. As discussed above, the result of the processing of such a knowledge graph to perform knowledge canvassing is a ranked listing of related entities that may be of interest to the originator of the original input request. FIG. 6 is an example diagram illustrating an output of a knowledge canvassing QA system in accordance with one illustrative embodiment. As shown in FIG. 6, the output comprises a ranked listing of related entities 610 and a corresponding portion of a supporting evidence passage 620 associated with the related entity. Thus, for example, in the depicted case the entity of interest is "Abraham Lincoln" and a first related entity is the "American Civil War" with a portion of a supporting evidence passage being provided in association with the related entity "American Civil War". A second related entity is "Emancipation Proclamation" with a corresponding portion of a supporting evidence passage being provided in association with the related entity "Emancipation Proclamation." This ranked listing may continue with additional related entities up to a desired limit. In some cases, the ranking metric 630 may be depicted in association with the particular related entity to give the user an indication of why the related entity was ranked the way it was and also to indicate how related the entity is believed to be to the entity of interest.

Each entry in the ranked listing is selectable to obtain more information about that particular related entity, e.g., a listing of supporting evidence passages and corresponding abstracts or summaries of these supporting evidence passages. Moreover, in some cases, by selecting an entry in the ranked listing, and a corresponding user interface element, the user may request that the knowledge canvassing process be repeated with the selected related entity being used as the entity of interest. In this way, the process may be repeated with the newly selected related entity. In some illustrative embodiments, when doing so, the criteria for candidate relationship selection may maintain knowledge of each previous entity of interest so that relationships with previous entities of interest may be effectively filtered out of the subsequent candidate relationships for subsequent entities of interest. This reduces repetition of related entities in the results generated. For example, if a first entity of interest is "Abraham Lincoln" and a related entity is determined to be "American Civil War", which is then selected by the user for a subsequent iteration of knowledge canvassing, relationships with Abraham Lincoln may be filtered out of the subsequent iteration in which "American Civil War" is now the entity of interest.

Figure 7:
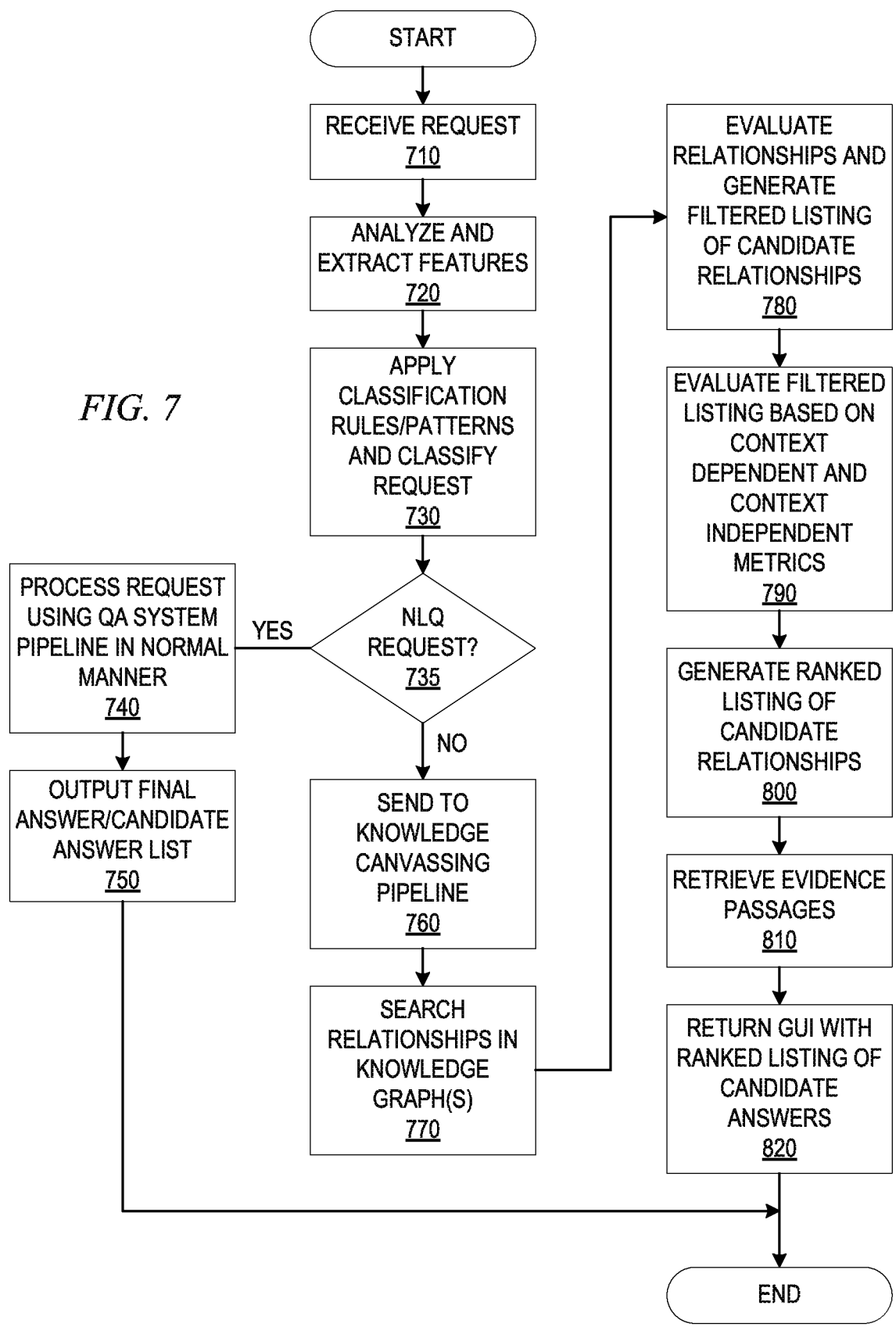
FIG. 7 is a diagram outlining an example operation of a knowledge canvassing QA system in accordance with one illustrative embodiment.

FIG. 7 is a diagram outlining an example operation of a knowledge canvassing QA system in accordance with one illustrative embodiment. As shown in FIG. 7, the operation starts with receiving a request from an originator of the request, e.g., a user may manually input a textual request via a client computing device, such as client 110 in FIG. 1 (step 710). The input request is analyzed to extract features of the input request, including entities identified in the request (step 720). Request classification rules/patterns are applied to the extracted features and the request is classified as either a targeted natural language question or a non-targeted knowledge canvassing request (step 730). If the request is a targeted natural language question (step 735), then the request is processed by a question and answer (QA) system pipeline in a normal manner (step 740) and a final answer or listing of candidate answers is output (step 750). If the request is a non-targeted knowledge canvassing request, then the request is sent to a knowledge canvassing pipeline for processing (step 760).

The knowledge canvassing pipeline utilizes the identified entities in the request to identify nodes (starting nodes) in a knowledge graph that correspond to the entities and then identifies related nodes (end nodes) linked to these starting nodes as representing related entities (step 770). The resulting relationships between the starting nodes and end nodes are evaluated based on evidence passages to score the relationships and a filtered listing of candidate relationships is generated based on candidate relationship selection criteria (step 780). The filtered listing of candidate relationships is then evaluated with regard to context dependent and context independent metrics (step 790) and a ranked listing of candidate relationships is generated based on the metrics (step 800). Evidence passages associated with the relationships in the ranked listing of candidate relationships are retrieved and associated with the candidate relationships (step 810). The ranked listing of candidate relationships is then returned to the originator of the request (step 820) and the operation terminates.

Thus, the illustrative embodiments provide mechanisms for performing both targeted question answering and knowledge canvassing requests. In one illustrative embodiment, these operations are performed in the alternative based on a classification of the input request. In other illustrative embodiments, both operations may be performed concurrently. Through processing of knowledge canvassing requests, the user is able to be given other related information that the user may be interested in, even though the user did not specifically request this related information. Thus, for example, a user may entire merely the identification of an entity and other related entities may be automatically identified, ranked, and returned to the user as possible areas of interest for the user to explore.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a data processing system, causes the data processing system to implement a cognitive system for processing a knowledge canvassing request, wherein the computer readable program causes the data processing system to:

receive, by the cognitive system, a request specifying at least one entity of interest from an originator of the request, wherein the cognitive system comprises a request classification engine, a factoid QA system pipeline, and a knowledge canvassing pipeline;

analyze, by the cognitive system, the request to extract one or more features of the request;

determine, by the request classification engine, whether the request is a targeted natural language question to be answered or a knowledge canvassing request, based on a comparison of the one or more extracted features against one or more classification rules or patterns;

in response to determining that the request is a targeted natural language question, route, by the request classification engine, the request to the factoid QA system pipeline which processes the request as a natural language question using natural language processing (NLP) mechanisms;

in response to determining that the request is a knowledge canvassing request, route, by the request classification engine, the request to the knowledge canvassing pipeline and process, by the knowledge canvassing pipeline, the request by identifying entities represented in a knowledge graph data structure as being related to the at least one entity of interest to suggest other areas of potential interest to the originator of the request; and output, by the cognitive system, results of the processing of the request to the originator of the request, wherein processing the request comprises:

identifying, by the cognitive system, entities in the request;

performing, by relationship search logic within the knowledge canvassing pipeline, a search of the knowledge graph to find corresponding nodes to the identified entities and identifying related nodes in the knowledge graph that have links connecting the identified entities with the related nodes representing related entities;

analyzing, by passage relevancy scoring logic within the knowledge canvassing pipeline, evidence passages of a corpus of documents that are associated with the related nodes to determine whether there is support for relationships between the identified entities and the related entities;

selecting, by candidate relationship generation logic within the knowledge canvassing pipeline, a set of candidate relationships between identified entities and related entities based on candidate relationship selection criteria;

performing, by independent relevancy scoring logic within the knowledge canvassing pipeline, analysis of the set of candidate relationships that is context independent;

identifying, by context dependent relevancy scoring logic within the knowledge canvassing pipeline, portions of the corpus of documents where entities of the set of candidate relationships are mentioned and evaluates a context of the portions of the corpus of documents to determine a context dependent metric to associate with each candidate relationship;

determining, by final merging and ranking logic within the knowledge canvassing pipeline, a ranked listing of the set of candidate relationships based on context dependent and context independent metrics; and retrieving, by evidence passage retrieval logic within the knowledge canvassing pipeline, evidential passages from the corpus of documents that reference the entities in the ranked set of candidate relationships.

2. The computer program product of claim 1, wherein the knowledge graph data structure comprises a plurality of nodes representing different entities identified in a corpus of information ingested by the data processing system, and edges between nodes representing relationships between the entities corresponding to the nodes as identified by analyzing a context of references to the entities in the corpus of information.

3. The computer program product of claim 2, wherein the computer readable program further causes the data processing system to process the request by identifying entities represented in the knowledge graph data structure as being related to the at least one entity of interest at least by identifying at least one node in the knowledge graph corresponding to the at least one entity of interest and related entities connected to the at least one node by one or more edges in the knowledge graph data structure.

4. The computer program product of claim 3, wherein the computer readable program further causes the data processing system to process the request at least by ranking the related entities by scoring each related entity in accordance with a relatedness metric associated with edges connecting the related entity to the at least one entity of interest, and wherein the computer readable program further causes the data processing system to output results of the processing at least by outputting a ranked listing of the related entities based on the ranking of the related entities.

5. The computer program product of claim 4, wherein the relatedness metric is an inverse document frequency (IDF) metric representing a degree of rarity of the relationship between the related entity and the entity of interest in the corpus of information.

6. The computer program product of claim 4, wherein the ranking of the related entities is performed in accordance with a domain specific ranking criteria indicating a criteria that is of greater desirability in the context of the domain.

7. The computer program product of claim 4, wherein the computer readable program further causes the data processing system to receive a user input selecting a related entity in the ranked listing of related entities to be a new entity of interest, and repeating the analyze, determine, process, and output operations with the new entity of interest being the entity of interest associated with a new request to identify related entities.

8. The computer program product of claim 4, wherein scoring each related entity comprises generating, for the related entity, a context independent score and a context dependent score, and calculating a score for the related entity based on a combination of the context independent score and the context dependent score.

9. The computer program product of claim 1, wherein the computer readable program further causes the data processing system to output results of the processing of the request to the originator of the request at least by outputting results comprising a listing of one or more related entities and, for each related entity of the one or more related entities, a portion of at least one text passage from a corpus of information in which a relationship of the related entity with the entity of interest is referenced.

10. An apparatus comprising:

a processor; and a memory coupled to the processor, wherein the memory comprises instructions which, when executed by the processor, cause the processor to implement a cognitive system for processing a knowledge canvassing request, wherein the instructions causes the processor to:

receive, by the cognitive system, a request specifying at least one entity of interest from an originator of the request, wherein the cognitive system comprises a request classification engine, a factoid QA system pipeline, and a knowledge canvassing pipeline;

analyze, by the cognitive system, the request to extract one or more features of the request;

determine, by the request classification engine, whether the request is a targeted natural language question to be answered or a knowledge canvassing request, based on a comparison of the one or more extracted features against one or more classification rules or patterns;

in response to determining that the request is a targeted natural language question, route, by the request classification engine, the request to the factoid QA system pipeline which processes the request as a natural language question using natural language processing (NLP) mechanisms;

in response to determining that the request is a knowledge canvassing request, route, by the request classification engine, the request to the knowledge canvassing pipeline and process, by the knowledge canvassing pipeline, the request by identifying entities represented in a knowledge graph data structure as being related to the at least one entity of interest to suggest other areas of potential interest to the originator of the request; and output, by the cognitive system, results of the processing of the request to the originator of the request, wherein processing the request comprises:

identifying, by the cognitive system, entities in the request;

performing, by relationship search logic within the knowledge canvassing pipeline, a search of the knowledge graph to find corresponding nodes to the identified entities and identifying related nodes in the knowledge graph that have links connecting the identified entities with the related nodes representing related entities;

analyzing, by passage relevancy scoring logic within the knowledge canvassing pipeline, evidence passages of a corpus of documents that are associated with the related nodes to determine whether there is support for relationships between the identified entities and the related entities;

selecting, by candidate relationship generation logic within the knowledge canvassing pipeline, a set of candidate relationships between identified entities and related entities based on candidate relationship selection criteria;

performing, by independent relevancy scoring logic within the knowledge canvassing pipeline, analysis of the set of candidate relationships that is context independent;

identifying, by context dependent relevancy scoring logic within the knowledge canvassing pipeline, portions of the corpus of documents where entities of the set of candidate relationships are mentioned and evaluates a context of the portions of the corpus of documents to determine a context dependent metric to associate with each candidate relationship;

determining, by final merging and ranking logic within the knowledge canvassing pipeline, a ranked listing of the set of candidate relationships based on context dependent and context independent metrics; and retrieving, by evidence passage retrieval logic within the knowledge canvassing pipeline, evidential passages from the corpus of documents that reference the entities in the ranked set of candidate relationships.

11. The apparatus of claim 10, wherein the knowledge graph data structure comprises a plurality of nodes representing different entities identified in a corpus of information ingested by the data processing system, and edges between nodes representing relationships between the entities corresponding to the nodes as identified by analyzing a context of references to the entities in the corpus of information.

12. The apparatus of claim 11, wherein the instructions further cause the processor to process the request by identifying entities represented in the knowledge graph data structure as being related to the at least one entity of interest at least by identifying at least one node in the knowledge graph corresponding to the at least one entity of interest and related entities connected to the at least one node by one or more edges in the knowledge graph data structure.

13. The apparatus of claim 12, wherein the instructions further cause the processor to process the request at least by ranking the related entities by scoring each related entity in accordance with a relatedness metric associated with edges connecting the related entity to the at least one entity of interest, and wherein the computer readable program further causes the data processing system to output results of the processing at least by outputting a ranked listing of the related entities based on the ranking of the related entities.

14. The apparatus of claim 13, wherein the relatedness metric is an inverse document frequency (IDF) metric representing a degree of rarity of the relationship between the related entity and the entity of interest in the corpus of information.

15. The apparatus of claim 13, wherein the ranking of the related entities is performed in accordance with a domain specific ranking criteria indicating a criteria that is of greater desirability in the context of the domain.

16. The apparatus of claim 13, wherein the instructions further cause the processor to receive a user input selecting a related entity in the ranked listing of related entities to be a new entity of interest, and repeating the analyze, determine, process, and output operations with the new entity of interest being the entity of interest associated with a new request to identify related entities.

17. The apparatus of claim 13, wherein scoring each related entity comprises generating, for the related entity, a context independent score and a context dependent score, and calculating a score for the related entity based on a combination of the context independent score and the context dependent score.

18. The apparatus of claim 10, wherein the instructions further cause the processor to output results of the processing of the request to the originator of the request at least by outputting results comprising a listing of one or more related entities and, for each related entity of the one or more related entities, a portion of at least one text passage from a corpus of information in which a relationship of the related entity with the entity of interest is referenced.

* * * * *